US005790884A

United States Patent [19]
Weinman et al.

[11] Patent Number: 5,790,884
[45] Date of Patent: Aug. 4, 1998

[54] INTEGRATED CONTROLLER WITH FIRST AND SECOND CONTROLLER CONTROLLING INFORMATION TRANSFERS WHEN THE INPUT ADDRESS RANGES FALLS WITHIN RANGES CONTROLLED BY FIRST AND SECOND CONTROLLER RESPECTIVELY

[75] Inventors: David Scott Weinman, Dallas; William Vincent Miller, Arlington, both of Tex.

[73] Assignee: National Semiconductor Corporation, Santa Clara, Calif.

[21] Appl. No.: 919,888

[22] Filed: Aug. 28, 1997

Related U.S. Application Data

[63] Continuation of Ser. No. 451,420, May 26, 1995, abandoned.

[51] Int. Cl.$^6$ .................................................. G06F 13/00
[52] U.S. Cl. ........................................... 395/824; 395/308
[58] Field of Search .............................. 364/240.5, 260; 395/280, 281, 306, 308, 824

[56] References Cited

U.S. PATENT DOCUMENTS

| 3,902,162 | 8/1975 | Parkinson et al. | 395/871 |
|---|---|---|---|
| 4,245,307 | 1/1981 | Kapeghian et al. | 395/287 |
| 4,257,095 | 3/1981 | Nadir | 395/299 |
| 4,263,650 | 4/1981 | Bennett et al. | 395/851 |
| 4,815,034 | 3/1989 | Mackey | 395/884 |
| 5,131,081 | 7/1992 | MacKenna et al. | 395/842 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |

FOREIGN PATENT DOCUMENTS 3224366  3/1991  Japan .

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power-On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., 80×86 Architecture and Programming, vol. II: Architecture Reference, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

(List continued on next page.)

*Primary Examiner*—Thomas C. Lee
*Assistant Examiner*—Anderson I. Chen
*Attorney, Agent, or Firm*—Limbach & Limbach LLP

[57] ABSTRACT

The pin count of an integrated ISA-type bus controller and PCMCIA-type bus controller is reduced by utilizing a single external bus which supports both ISA-type and PCMCIA-type devices, and by placing control over the bus with the controller that controls the device that corresponds with the input address ADD.

20 Claims, 5 Drawing Sheets

OTHER PUBLICATIONS

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

IBM Technical Disclosure Bulletin, vol. 37, No. 7, "Multiple–Mode Selector for Input–Output Circuitryt" pp. 341–342, Jul. 1994.

1

INTEGRATED CONTROLLER WITH FIRST AND SECOND CONTROLLER CONTROLLING INFORMATION TRANSFERS WHEN THE INPUT ADDRESS RANGES FALLS WITHIN RANGES CONTROLLED BY FIRST AND SECOND CONTROLLER RESPECTIVELY

This is a continuation of co-pending application Ser. No. 08/451,420 filed on May 26, 1995, now abandoned.

BACKGROUND OF THE INVENTION

1. Field of the Invention

The present invention relates to a bus controller and, more particularly, to an integrated primary bus and secondary bus controller with a substantially reduced pin count.

2. Description of the Related Art

A bus interface unit (BIU) controller is a microprocessor peripheral device that controls data transfers across a primary bus to one or more external devices, such as a personal computer memory card industry association (PCMCIA) controller, a floppy-disk drive, or a hard-disk drive.

A PCMCIA controller, in turn, is an external device that controls data transfers across a secondary bus to one or more PCMCIA cards. As is well known, PCMCIA cards are credit-card sized devices which can be plugged into personal computers to provide additional capabilities, such as extended memory or communications support.

FIG. 1 shows a block diagram that illustrates a common primary and secondary bus structure. As shown in FIG. 1, a CPU 12 utilizes a local address bus LABUS and a local data bus LDBUS to communicate with, among other devices, a bus interface unit (BIU) 14 which, in turn, utilizes a primary address bus PABUS and a primary data bus PDBUS to communicate with a PCMCIA controller 16, a floppy-disk drive 18, and a hard-disk drive 20. A secondary address bus SABUS and a secondary data bus SDBUS are then utilized to provide communication between PCMCIA controller 16 and the PCMCIA cards.

Conventionally, BIU 14 and PCMCIA controller 16 are implemented as stand-alone chips because of, among other things, the high pin count that results from integration. For example, BIU 14 typically requires 48 address and data pins (32 address and 16 data) to communicate with CPU 12, and another 48 address and data pins to communicate with the peripheral devices connected to the primary buses PABUS and PDBUS.

Similarly, PCMCIA controller 16 also requires 48 address and data pins to communicate with BIU 14, and another 48 address and data pins to communicate with the PCMCIA cards. If the functionality of BIU 14 and PCMCIA controller 16 is then integrated into a single package, the combined BIU/PCMCIA controller would still require 144 address and data pins (48 to the local buses LABUS and LDBUS, 48 to the primary buses PABUS and PDBUS, and 48 to the secondary buses SABUS and SDBUS).

When combined with the various control pins, the total pin count can easily swell to more than 160 pins. One problem with this high a pin count is that the size of the package must be substantially increased to accommodate the pins which, in turn, substantially increases the cost of production. Thus, there is a need for a technique that allows the BIU and PCMCIA functions to be integrated within a single package that requires significantly fewer pins.

SUMMARY OF THE INVENTION

In a conventional microprocessor-based computer system, data transfers across a primary bus are controlled by a bus interface unit (BIU) controller, while data transfers across a secondary bus are controlled by a personal computer memory card industry association (PCMCIA) controller which is attached to the primary bus. The BIU controller and the PCMCIA controller, in turn, each typically require 96 address and data pins to support input and output address and data buses.

In the present invention, a BIU controller and a PCMCIA controller are integrated into a single package which only requires 96 address and data pins. The pin count is reduced by utilizing a single external bus which supports both ISA-type and PCMCIA-type devices, and by placing control over the bus with the controller that controls the device that corresponds with the input address ADD.

An integrated bus controller in accordance with the present invention includes a bus interface unit (BIU) controller that controls data transfers over an external bus when an input address falls within the address space controlled by the BIU controller, and a first plurality of control signals are set to predefined logic states. In addition, a PCMCIA controller also controls data transfers over the external bus when the input address falls within the address space controlled by the PCMCIA controller, and a second plurality of control signals are set to predefined logic states.

A better understanding of the features and advantages of the present invention will be obtained by reference to the following detailed description and accompanying drawings which set forth an illustrative embodiment in which the principals of the invention are utilized.

DETAILED DESCRIPTION

Figure 1:
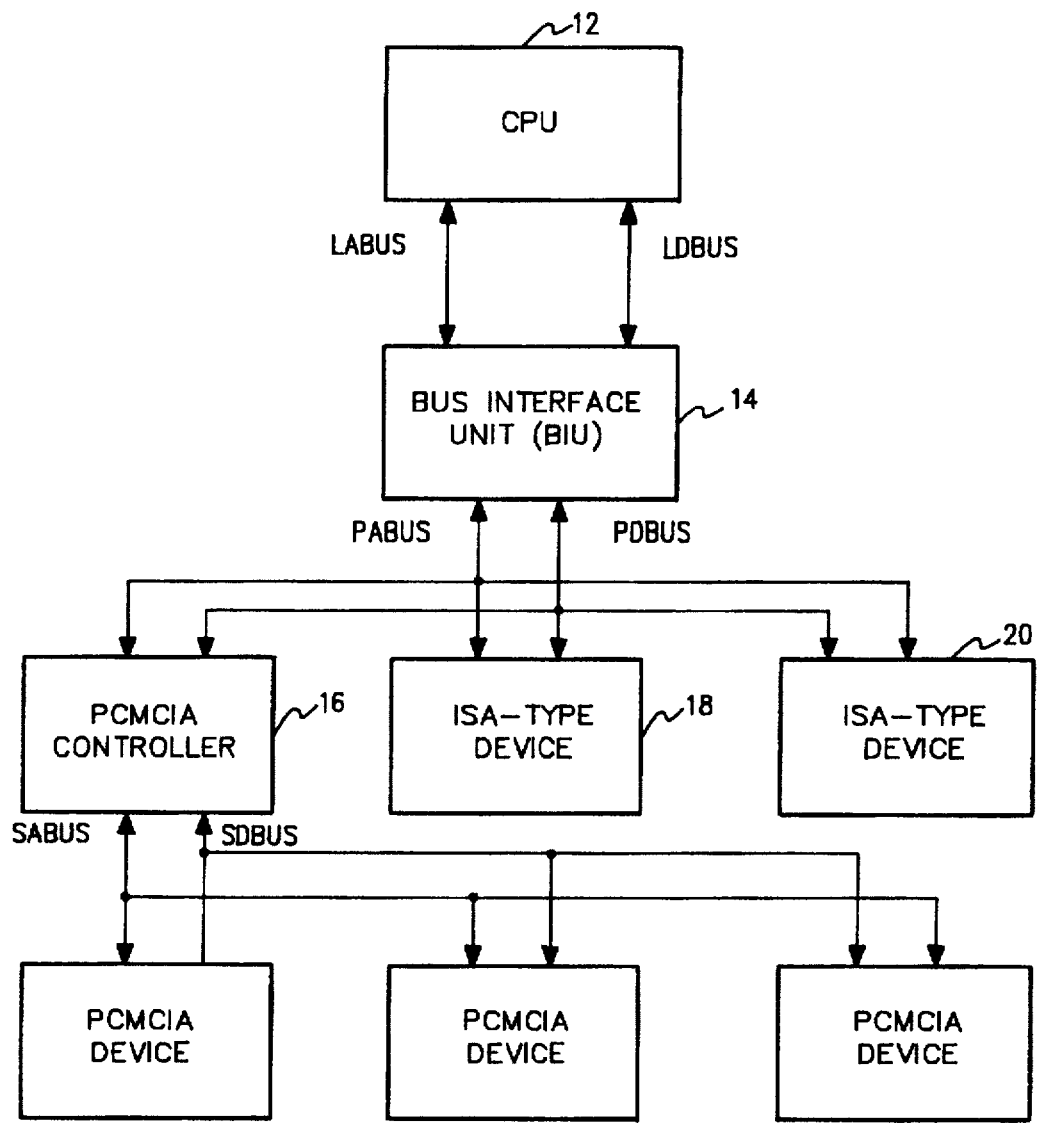
FIG. 1 shows a block diagram that illustrates a common primary and secondary bus structure.
Figure 2:
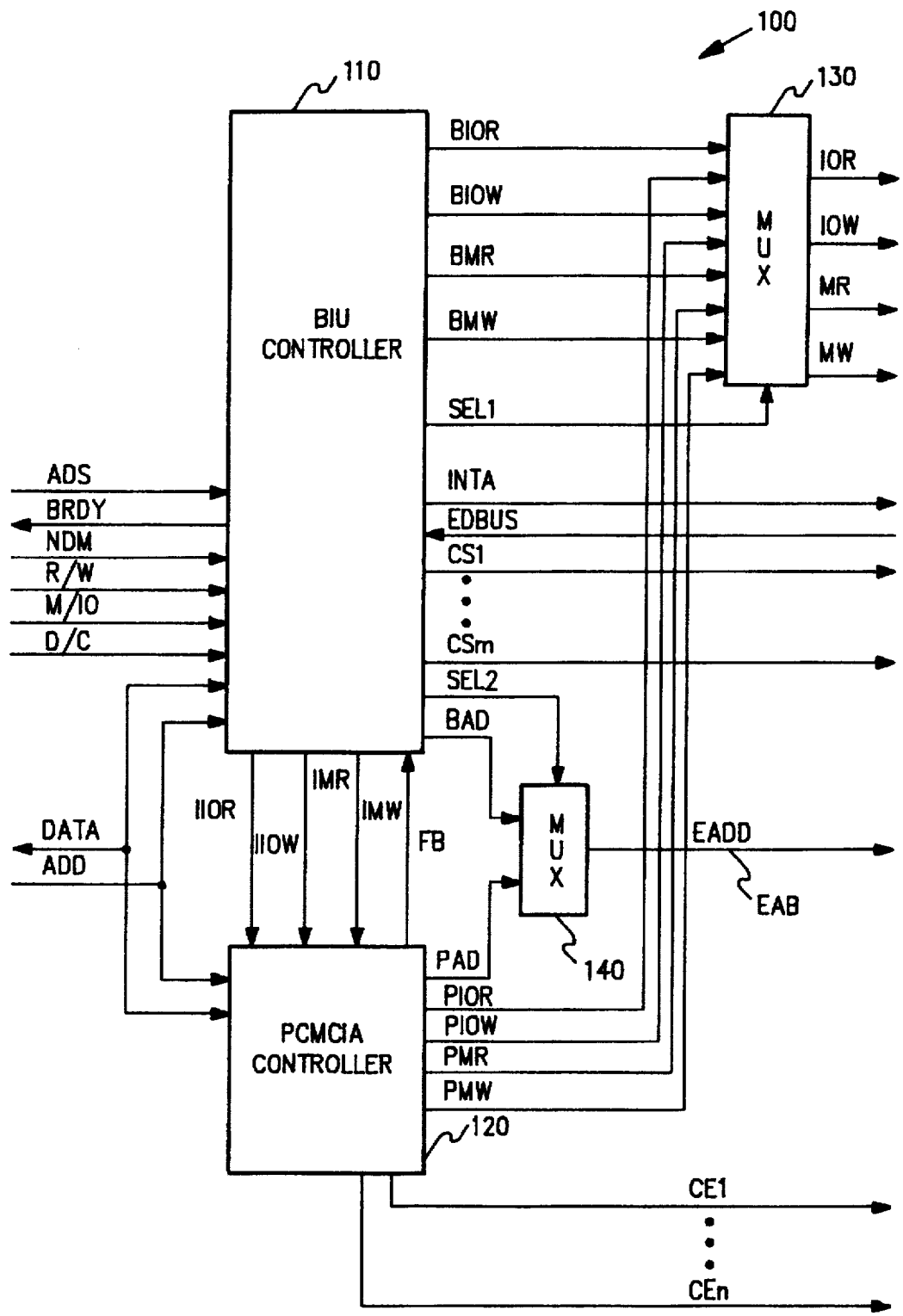
FIG. 2 is a block diagram that illustrates an integrated bus controller 100 in accordance with the present invention.

FIG. 2 shows a block diagram of an integrated bus controller 100 in accordance with the present invention. As shown in FIG. 2, controller 100 includes a bus interface unit (BIU) controller 110 that controls data transfers over an external data bus EDBUS when an input address ADD falls within the address space controlled by controller 110, and a first series of control signals are set to predefined logic states.

Further, in accordance with the present invention, controller 100 additionally includes a personal computer memory card industry association (PCMCIA) controller 120 that also controls data transfers over the external data bus EDBUS when the input address ADD falls within the address space controlled by controller 120, and a second series of control signals are set to predefined logic states.

As shown in FIG. 2, both BIU controller 110 and PCMCIA controller 120 receive the input address ADD, and output a BIU address BAD and a PCMCIA address PAD, respectively, in response to the input address ADD. In the FIG. 2 embodiment, controller 110 forms the BIU address BAD by passing the input address ADD, while controller 120 forms the PCMCIA address PAD by either passing or remapping the input address ADD. Alternately, controller 110 can also be configured to remap the input address ADD.

With respect to the first series of control signals, BIU controller 110 receives a memory/IO signal M/IO that indicates whether the request is to memory or an I/O device, a data/code signal D/C that indicates whether the request is for data or code, a read/write signal R/W that indicates whether the request is for a read or a write, an address strobe ADS that indicates whether the current input address ADD is valid, and an access signal NDM that indicates whether the request is to a dynamic random-access-memory (DRAM) or another device.

With respect to the second series of control signals, PCMCIA controller 120 receives from BIU controller 110 an internal I/O read strobe IIOR, which indicates that data is to be read from an I/O device, an internal I/O write strobe IIOW, which indicates that data is to be written to an I/O device, an internal memory read strobe IMR, which indicates that data is to be read from an external memory, and an internal memory write strobe IMW, which indicates that data is to be written to an external memory.

In addition, BIU controller 110 outputs the IIOR, IIOW, IMR, and IMW strobes as a BIU I/O read strobe BIOR, a BIU I/O write strobe BIOW, a BIU memory read strobe BMR, and a BIU memory write strobe BMW. Similarly, PCMCIA controller 120 outputs the IIOR, IIOW, IMR, and IMW strobes as a PCMCIA I/O read strobe PIOR, a PCMCIA I/O write strobe PIOW, a PCMCIA memory read strobe PMR, and a PCMCIA memory write strobe PMW.

In operation, the M/IO, D/C, and R/W signals are decoded by BIU controller 110 which, in turn, changes the logic state of either the internal I/O read strobe IIOR, the internal I/O write strobe IIOW, the internal memory read strobe IMR, or the internal memory write strobe IMW, depending on which operation is to be performed.

When the logic state of the ADS signal indicates that the input address ADD is valid, and the logic state of the access signal NDM indicates that the request is to a DRAM, controller 100 takes no further action. However, when the logic state of the ADS signal indicates that the input address ADD is valid, and the logic state of the access signal NDM indicates that the request is to a device other than a DRAM, BIU controller 110 outputs the internal strobe IIOR, IIOW, IMR, or IMW identified by the first series of control signals approximately one clock cycle after receiving the address strobe ADS.

Figure 3A:
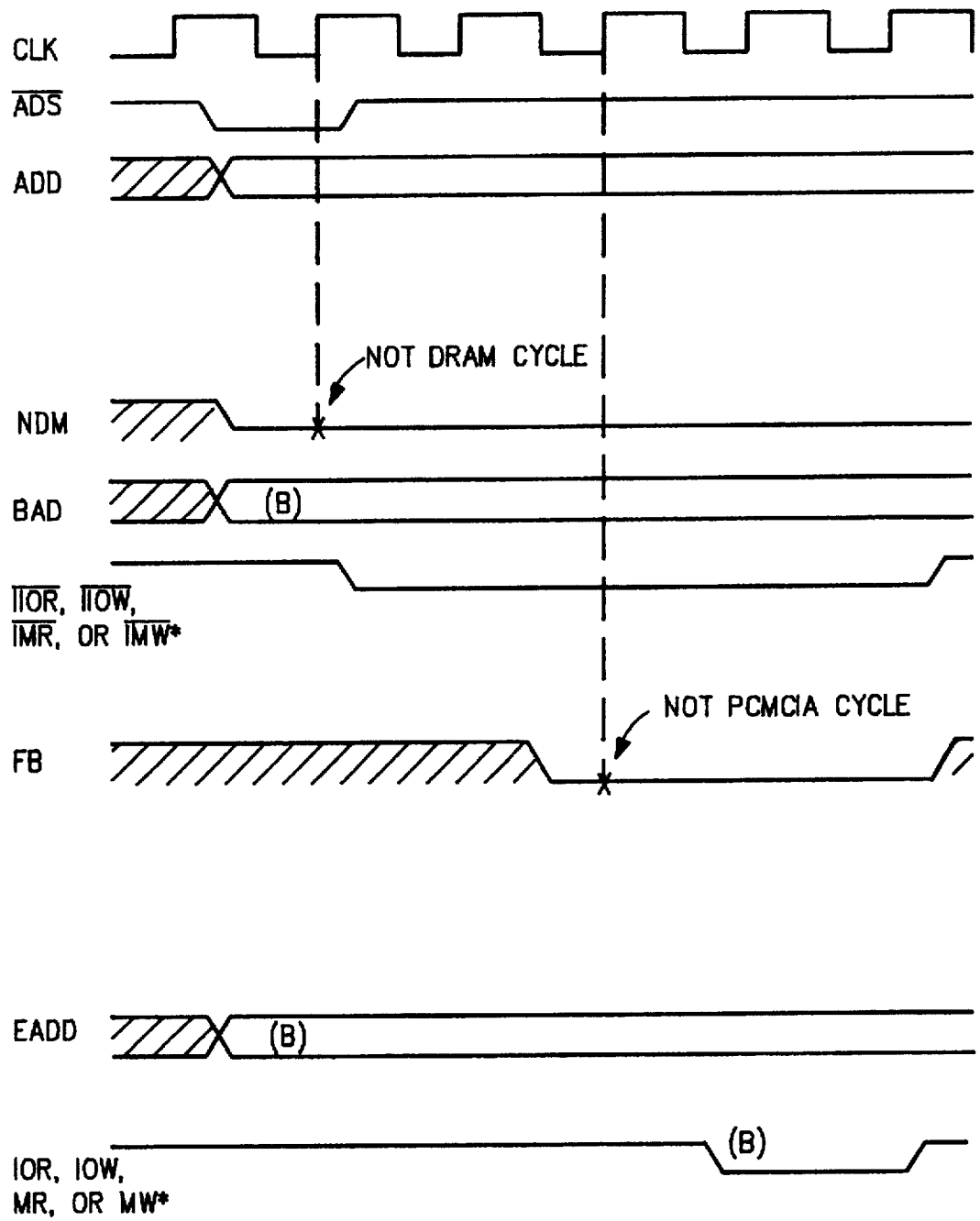
FIG. 3A and 3B are timing diagrams illustrating the operation of controller 100.
Figure 3B:
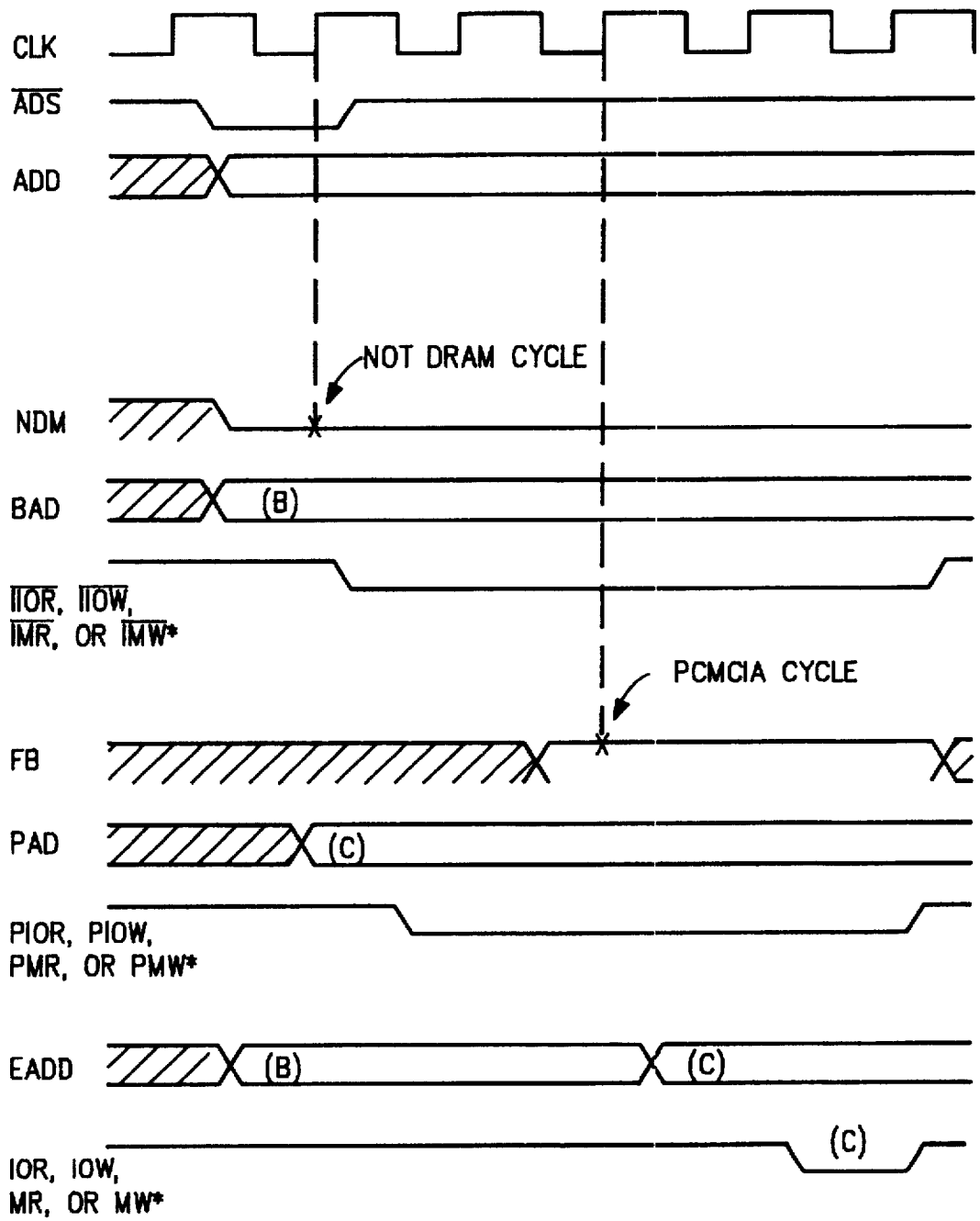

FIGS. 3A and 3B show timing diagrams that illustrate the operation of controller 100. As shown in FIG. 3A, after the rising edge of a first clock pulse, the input address ADD received by BIU controller 110 becomes valid on the falling edge of the address strobe ADS.

When the input address ADD becomes valid, BIU controller 110 sets a first select signal SEL1 to a first logic state which, in turn, causes a multiplexer 130 to pass the BIU strobe BIOR, BIOW, BMR, or BMW that corresponds with the internal strobe IIOR, IIOW, IMR, or IMW identified by the first series of control signals as an external strobe IOR, IOW, MR, or MW.

At this point, the changed logic state of the IIOR, IIOW, IMR, or IMW strobe is not output by BIU controller 110. As a result, all of the external strobes IOR, IOW, MR, and MW are set to a logic state that indicates that the address on the bus is invalid.

Similarly, BIU controller 110 also sets the logic state of a second select signal SEL2 to a first logic state which, in turn, causes a multiplexer 140 to pass the BIU address BAD as an external address EADD.

On the rising edge of the second clock pulse, BIU controller 110 checks the logic state of the access signal NDM, and outputs the internal strobe IIOR, IIOW, IMR, or IMW when the access signal NDM indicates that a device other than a DRAM is to be accessed.

In response to the internal strobe IIOR, IIOW, IMR, or IMW, PCMCIA controller 120 determines whether the input address ADD falls within the address space controlled by PCMCIA controller 120. In addition, PCMCIA controller 120 also outputs the PCMCIA strobe PIOR, PIOW, PMR, or PMW that corresponds with the internal strobe IIOR, IIOW, IMR, or IMW identified by the first series of control signals.

If the input address ADD is not within the PCMCIA controlled address space, PCMCIA controller 120 sets a feedback signal FB to a first logic state. On the rising edge of the fourth clock pulse, BIU controller 110 checks the logic state of the feedback signal FB and, when the logic state of the feedback signal FB is in the first logic state, thereby indicating that the input address ADD is not within the address space controlled by PCMCIA controller 120, outputs the internal strobe IIOR, IIOW, IMR, or IMW identified by the first series of control signals as the respective BIU strobe BIOR, BIOW, BMR, or BMW. The lowered BIU strobe BIOR, BIOW, BMR, or BMW, in turn, is passed by multiplexer 130, thereby indicating that the BIU address BAD output by multiplexer 140 is valid.

On the other hand, as shown in FIG. 3B, when the input address ADD is within the PCMCIA address space, PCMCIA controller 120 sets the feedback signal FB to a second logic state prior to the fourth clock period. On the rising edge of the fourth clock pulse, BIU controller 110 checks the logic state of the feedback signal FB, and changes the logic state of the select signal SEL2 so that multiplexer 140 passes the PCMCIA address PAD as the external address EADD.

In addition, BIU controller 110 changes the logic state of the select signal SEL1 so that, on the rising edge of the fifth clock pulse, multiplexer 130 passes the PCMCIA strobe PIOR, PIOW, PMR, or PMW as the external address strobe IOR, IOW, MR, or MW, thereby indicating that the PCMCIA address PAD output by multiplexer 140 is valid.

In addition, although code is not written to the I/O devices, the logical state of the data/code signal D/C can be utilized to indicate other conditions. Thus, for example, when code is written to an I/O device, BIU controller 110 interprets this logic condition as an interrupt acknowledge and outputs an interrupt acknowledge signal INTA.

In the FIG. 2 embodiment, the internal strobes IIOR, IIOW, IMR, IMW, and INTA output by controller 110 are utilized by both controllers 110 and 120. Alternately, both controllers 110 and 120 can be implemented to decode and output separate address strobes. Similarly, controller 120 can be implemented to decode and output the address strobes for both of the controllers.

In addition to the above-described control signals, both BIU controller 110 and PCMCIA controller 120 output one of a series of chip select signals CS1–CSm and one of a series of chip enable signals CE1–CEn, respectively, in response to the input address ADD when the input address ADD falls within the address range controlled by the controller.

Each device connected to the external address bus EAB corresponds with an address range programmed into either controller 110 or controller 120. When controller 110 or controller 120 determine that the input address ADD is within the address space controlled by that controller, controllers 110 and 120 also determine which device corresponds with the input address ADD, and output the chip select signal CS or chip enable signal CE, respectively, that corresponds with the device.

Thus, in the present invention, the number of pins required to support an integrated bus controller are reduced by utilizing a single bus to support both ISA-type devices, as well as PCMCIA-type devices, and by placing control over the bus with the controller that controls the device that corresponds with the input address ADD.

Figure 4:
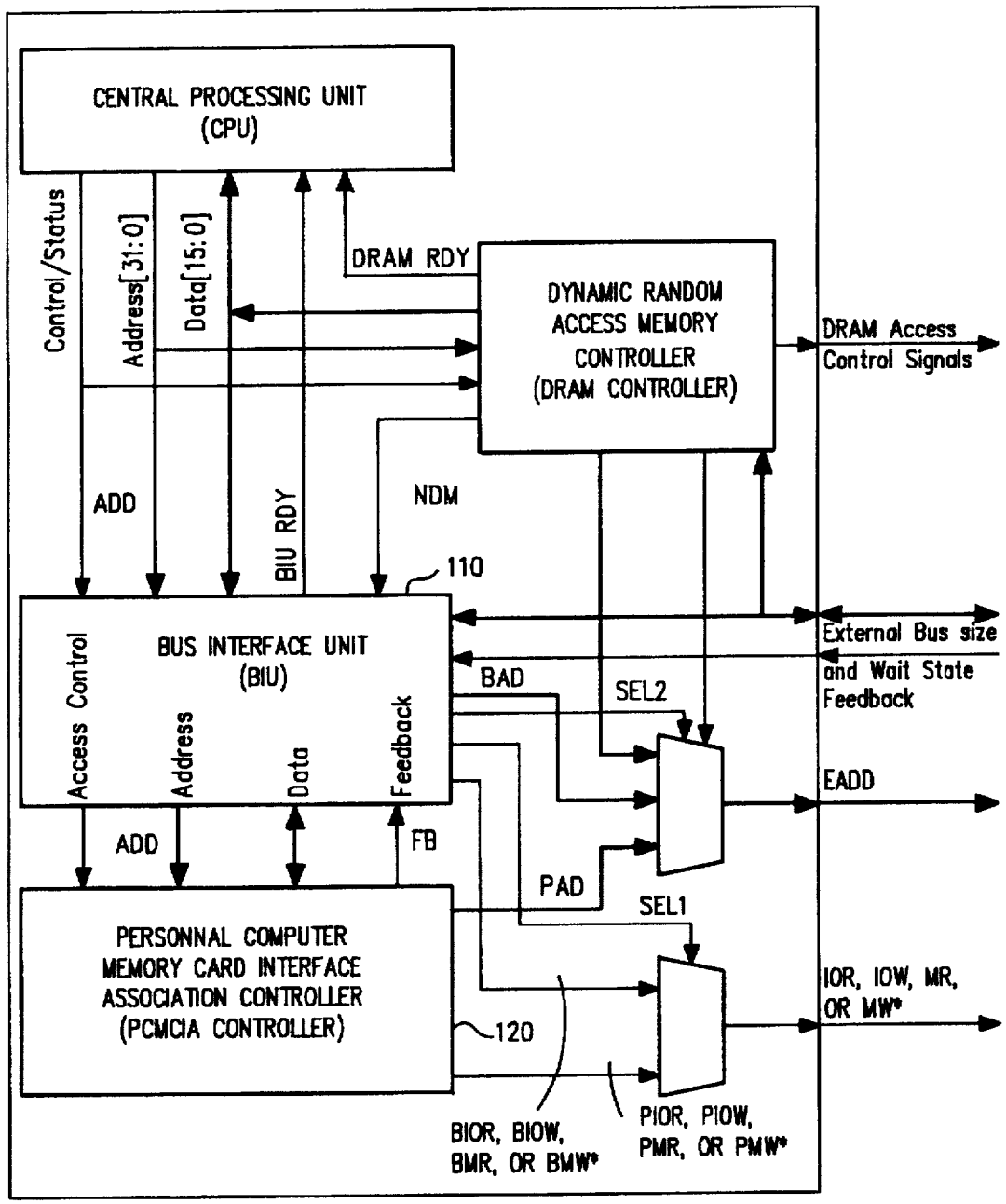
FIG. 4 is a block diagram illustrating the integration of a processor, a DRAM controller, a BIU controller, and a PCMCIA controller.

In addition to integrating the functionality of a BIU controller and a PCMCIA controller, the functionality of a dynamic random-access-memory (DRAM) controller can also be integrated with a processor. FIG. 4 shows a block diagram that illustrates the integration of a processor, a DRAM controller, a BIU controller, and a PCMCIA controller.

As shown in FIG. 4, by integrating three controllers with the processor, only a single external address bus and a single external data bus are required to support the combined functionality.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319 entitled "DISPLAY CONTROLLER CAPABLE OF ACCESSING AN EXTERNAL MEMORY FOR GRAY SCALE MODULATION DATA" now abandoned U.S. patent application Ser. No. 08/451,965, entitled "SERIAL INTERFACE CAPABLE OF OPERATING IN TWO DIFFERENT SERIAL DATA TRANSFER MODES" now U.S. Pat. No. 5,696,994; U.S. patent application Ser. No. 08/453,076, entitled "HIGH PERFORMANCE MULTIFUNCTION DIRECT MEMORY ACCESS (DMA) CONTROLLER" now abandoned U.S. patent application Ser. No. 08/452,001, entitled "OPEN DRAIN MULTI-SOURCE CLOCK GENERATOR HAVING MINIMUM PULSE WIDTH" now abandoned; U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" now abandoned. U.S. patent application Ser. No. 08/451,924, entitled "EXECUTION UNIT ARCHITECTURE TO SUPPORT x86 INSTRUCTION SET AND x86 SEGMENTED ADDRESSING" now U.S. Pat. No. 5,655,139 U.S. patent application Ser. No. 08/451,444, entitled "BARREL SHIFTER" now U.S. Pat. No. 5,652,718 U.S. patent application Ser. No. 08/451,204, entitled "BIT SEARCHING THROUGH 8, 16, OR 32-BIT OPERANDS USING A 32-BIT DATA PATH" still pending; U.S. patent application Ser. No. 08/451,195, entitled "DOUBLE PRECISION (64-BIT) SHIFT OPERATIONS USING A 32-BIT DATA PATH" now U.S. Pat. No. 5,687,102; U.S. patent application Ser. No. 08/451,571, entitled "METHOD FOR PERFORMING SIGNED DIVISION" still pending U.S. patent application Ser. No. 08/452,162, entitled "METHOD FOR PERFORMING ROTATE THROUGH CARRY USING A 32-BIT BARREL SHIFTER AND COUNTER" now U.S. Pat. No. 5,682,339; U.S. patent application Ser. No. 08/451,434, entitled "AREA AND TIME EFFICIENT FIELD EXTRACTION CIRCUIT" still pending. U.S. patent application Ser. No. 08/451,535, entitled "NON-ARITHMETICAL CIRCULAR BUFFER CELL AVAILABILITY STATUS INDICATOR CIRCUIT" now U.S. Pat. No. 5,617,543; U.S. patent application Ser. No. 08/445,563, entitled "TAGGED PREFETCH AND INSTRUCTION DECODER FOR VARIABLE LENGTH INSTRUCTION SET AND METHOD OF OPERATION" still pending U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" now U.S. Pat. No. 5,649,147. U.S. patent application Ser. No. 08/451,219, entitled "CIRCUIT FOR GENERATING A DEMAND-BASED GATED CLOCK" now U.S. Pat. No. 5,598,112 U.S. patent application Ser. No. 08/451,214, entitled "INCREMENTOR/DECREMENTOR" now U.S. Pat. No. 5,583,453. U.S. patent application Ser. No. 08/451,150, entitled "A PIPELINED MICROPROCESSOR THAT PIPELINES MEMORY REQUESTS TO AN EXTERNAL MEMORY" still pending U.S. patent application Ser. No. 08/451,198, entitled "CODE BREAKPOINT DECODER" now U.S. Pat. No. 5,717,909 U.S. patent application Ser. No. 08/455,569, entitled "TWO TIER PREFETCH BUFFER STRUCTURE AND METHOD WITH BYPASS" now U.S. Pat. No. 5,680,564; U.S. patent application Ser. No. 08/445,564, entitled "INSTRUCTION LIMIT CHECK FOR MICROPROCESSOR" now abandoned. U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" now abandoned; U.S. U.S. patent application Ser. No. 08/452,080, entitled "APPARATUS AND METHOD FOR EFFICIENT COMPUTATION OF A 486™ MICROPROCESSOR COMPATIBLE POP INSTRUCTION" now abandoned. U.S. patent application Ser. No. 08/450,154, entitled "APPARATUS AND METHOD FOR EFFICIENTLY DETERMINING ADDRESSES FOR MISALIGNED DATA STORED IN MEMORY" now abandoned. U.S. patent application Ser. No. 08/451,742, entitled "METHOD OF IMPLEMENTING FAST 486™ MICROPROCESSOR COMPATIBLE STRING OPERATION" now U.S. Pat. No. 5,692,146 U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" now U.S. Pat. No. 5,659,712. U.S. patent application Ser. No. 08/451,507, entitled "DRAM CONTROLLER THAT REDUCES THE TIME REQUIRED TO PROCESS MEMORY REQUESTS" now abandoned. U.S. patent application Ser. No. 08/452,365, entitled "SUPPLY AND INTERFACE CONFIGURABLE INPUT/OUTPUT BUFFER" now U.S. Pat. No. 5,612,637. U.S. patent application Ser. No. 08/451,744, entitled "CLOCK GENERATION CIRCUIT FOR A DISPLAY CONTROLLER HAVING A FINE TUNEABLE FRAME RATE" still pending U.S. patent application Ser. No. 08/451,206, entitled "CONFIGURABLE POWER MANAGEMENT SCHEME" still pending U.S. patent application Ser. No. 08/452,350, entitled "BIDIRECTIONAL PARALLEL SIGNAL INTERFACE" now U.S. Pat. No. 6,710,939. U.S. patent application Ser. No. 08/452,094, entitled "LIQUID CRYSTAL DISPLAY (LCD) PROTECTION CIRCUIT" now U.S. Pat. No. 5,751,812 U.S. patent application Ser. No. 08/450,156, entitled "DISPLAY CONTROLLER CAPABLE OF ACCESSING GRAPHICS DATA FROM A SHARED SYSTEM MEMORY" still pending U.S. Pat. No. 5,541,935, entitled "INTEGRATED CIRCUIT WITH TEST SIGNAL BUSES AND TEST CONTROL CIRCUITS" U.S. patent application Ser. no. 08/455,568, entitled "DECODE BLOCK TEST METHOD AND APPARATUS" now U.S. Pat. No. 5,699,506.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. An integrated bus controller comprising:
 a first bus controller connectable to a plurality of first address and data lines, and a plurality of second address and data lines, the first bus controller receiving an input address from the first address lines, and controlling information transfers between a device connected to the first data lines and a device connected to the second data lines when the input address falls within an address space controlled by the first bus controller, and a first plurality of control signals are set to predefined logic states; and
 a second bus controller connectable to the first address and data lines and the second address and data lines, the second bus controller receiving the input address from the first address lines, and controlling information transfers between a device connected to the first data lines and a device connected to the second data lines when the input address falls within an address space controlled by the second bus controller, and a second plurality of control signals are set to predefined logic states.

2. The controller of claim 1 wherein the information transfers over the second data lines are in a first format when the first bus controller controls the second data lines, and a second format when the second bus controller controls the second data lines.

3. The controller of claim 1 wherein the first format includes an ISA type, and the second format includes a PCMCIA type.

4. An integrated bus controller comprising:
 a first bus controller connectable to a first bus and a second bus that receives an input address from the first bus, determines whether the input address falls within a first address space, and controls information transfers over the second bus when the input address falls within the first address space, and a first plurality of input control signals are set to predefined logic states; and
 a second bus controller connectable to the first bus and the second bus that receives the input address from the first bus, determines whether the input address falls within a second address space, and controls information transfers over the second bus when the input address falls within the second address space, and a second plurality of input control signals are set to predefined logic states.

5. The controller of claim 4 wherein the information transfers over the second bus are in a first format when the first bus controller controls the second bus.

6. The controller of claim 5 wherein the first format includes an ISA-type.

7. The controller of claim 5 wherein the information transfers over the second bus are in a second format when the second bus controller controls the second bus.

8. The controller of claim 7 wherein the second format includes an PCMCIA-type.

9. The controller of claim 4 wherein the first controller outputs a first address in response to the input address.

10. The controller of claim 9 wherein the second controller outputs a second address in response to the input address.

11. The controller of claim 10 and further comprising a multiplexor that receives both the first address and the second address, outputs the first address onto the second bus when the input address falls within the address space controlled by the first controller, and outputs the second address onto the second bus when the input address falls within the address space controlled by the second controller.

12. The controller of claim 4 wherein the first controller outputs a first plurality of output control signals in response to the first plurality of input control signals.

13. The controller of claim 12 wherein the second controller outputs a second plurality of output control signals in response to the second plurality of input control signals.

14. The controller of claim 13 and further comprising a multiplexor that receives both the first and second output control signals, outputs the first plurality of output control signals when the input address falls within the address space controlled by the first controller, and outputs the second plurality of output control signals when the input address falls within the address space controlled by the second controller.

15. The controller of claim 4 wherein the first controller asserts a select line when information is to be transferred across the second bus and the input address falls within the address space controlled by the first controller.

16. The controller of claim 4 wherein the second bus controller receives the second plurality of input control signals from the first bus controller.

17. An integrated bus controller comprising:
 a first bus controller connectable to a first bus and a second bus that receives an input address from the first bus, determines whether the input address falls within a first address space, and controls information transfers over the second bus when the input address falls within the first address space, and a first plurality of input control signals are set to predefined logic states;
 a second bus controller connectable to the first bus and the second bus that receives the input address from the first bus, determines whether the input address falls within a second address space, and controls information transfers over the second bus when the input address falls within the second address space, and a second plurality of input control signals are set to predefined logic states, and
 a third bus controller connectable to the first bus and the second bus that receives the input address from the first bus, determines whether the input address falls within a third address space, and controls information transfers over the second bus when the input address falls within the third address space, and the first plurality of input control signals are set to the predefined logic states.

18. The controller of claim 17 wherein the first controller outputs a first address in response to the input address, the second controller outputs a second address in response to the input address, and the third controller outputs a third address in response to the input address.

19. The controller of claim 18 and further comprising a multiplexor that receives the first, second, and third addresses, outputs the first address when the input address falls within the address space controlled by the first controller, outputs the second address when the input address falls within the address space controlled by the second controller, and outputs the third address when the input address falls within the address space controlled by the third controller.

20. The controller of claim 19 wherein the information transfers over the bus are in a first format when the first bus controller controls the second bus, a second format when the second bus controller controls the second bus, and a third format when the third bus controller controls the second bus.

* * * * *